Jan. 23, 1968
S. C. BELL
3,365,485
2-ACETOXYACETAMIDO-5-CHLORO-BENZOPHENONE
Original Filed May 7, 1964
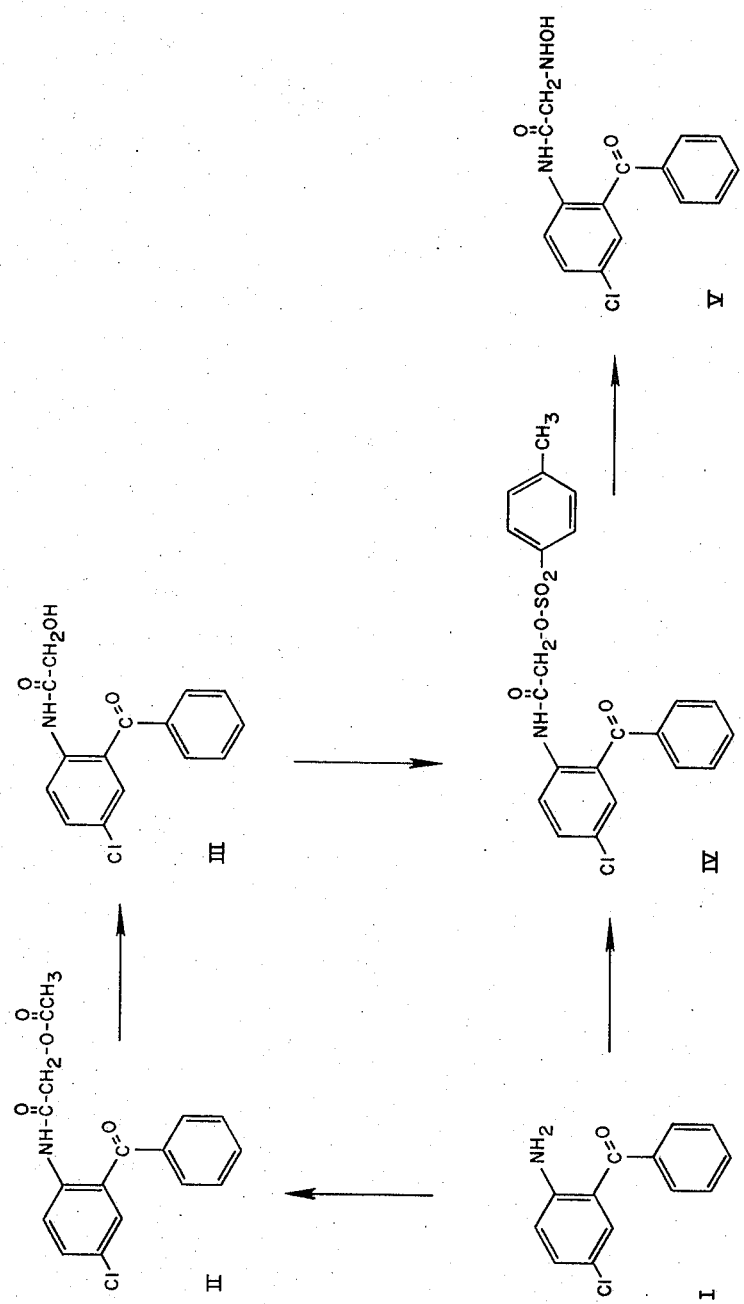
INVENTOR
STANLEY C. BELL
BY Vito Victor Bellino

United States Patent Office 3,365,485
Patented Jan. 23, 1968

3,365,485
2-ACETOXYACETAMIDO-5-CHLORO-BENZOPHENONE
Stanley C. Bell, Penn Valley, Pa., assignor to American Home Products Corporation, New York, N.Y., a corporation of Delaware
Original application May 7, 1964, Ser. No. 365,773. Divided and this application July 1, 1966, Ser. No. 562,374
1 Claim. (Cl. 260—490)

This application is a division of Ser. No. 365,773, filed May 7, 1964, which is a continuation-in-part of Ser. No. 301,873, filed Aug. 13, 1963.

This invention relates to compositions of matter classified in the art of chemistry as substituted 2-aminophenyl aryl ketones and to processes for making and using them.

The invention sought to be patented in its principal composition aspect, is described as residing in the concept of a chemical compound having a molecular structure in which the 2-aminobenzophenone nucleus has attached to the 2-position amino nitrogen, the phenylsulfonoxyacetyl radical.

The tangible embodiments of the compositions of the invention possess the inherent general physical properties of being relatively high melting, white crystalline solids, are substantially insoluble in water and are soluble in polar solvents, such as lower aliphatic alcohols either cold or on warming. Examination of the compounds produced according to the hereinafter described process reveals upon ultraviolet and infrared spectrographic analysis, spectral data confirming the molecular structure hereinbefore set forth. Thus the —$SO_2$— linkage is evident. The aforementioned physical characteristics, taken together with the nature of the starting materials and the mode of synthesis, positively confirm the structure of the compositions sought to be patented.

The tangible embodiments of the composition aspect of the invention possess the applied use of characteristic of being starting materials for the production of valuable intermediates, i.e. hydroxyaminoacetamidobenzophenones, useful for the preparation of 5-phenyl-1,3-dihydro-2H-1,4-benzodiazepin-2-ones as disclosed in copending application U.S. Ser. No. 301,873, filed Aug. 13, 1963.

The invention sought to be patented in a further composition aspect is described as residing in the concept of a chemical compound having a molecular structure in which the 2-aminobenzophenone nucleus has attached to the 2-position amino nitrogen, the hydroxyacetal radical.

The tangible embodiments of the further composition aspect of the invention possess the applied characteristic of being intermediates in the preparation of the compositions of the principal composition aspect.

The invention sought to be patented in a process of using aspect is described as residing in the concept of converting a compound having the 2-phenylsulfonoxyacetamido radical, attached in the 2-position of the benzophenone nucleus, to the 2-hydroxyaminoacetamido radical by mixing hydroxylamine with the substituted aryl ketone dispersed in a liquid medium inert with respect to the reactants.

The invention sought to be patented in a principal process of making aspect is described as residing in the concept of a sequence of reactions including: converting a 2-aminobenzophenone to a 2-acetoxyacetamidobenzophenone by treatment with acetylglycolyl halide, removing by hydrolysis the acetyl group to obtain the corresponding alcohol and converting said 2-hydroxyacetamidobenzophenone to a 2-phenylsulfonoxyacetamidobenzophenone by treatment with a phenylsulfonyl halide.

The invention sought to be patented in a further process of making aspect is described as residing in the concept of converting the amino radical attached in the 2-position of a benzophenone to a phenylsulfonoxyacetamido radical by treatment with phenylsulfonoxyacetyl chloride, preferably in such manner that an excess of the amino aryl ketone is preserved in the reaction mixture.

The manner and process of making and using the processes and compositions of the invention will now be generally described so as to enable a person skilled in the art of chemistry to use the same, as follows:

The new processes of my invention are illustrated schematically for a specific embodiment in FIGURE 1 to which the Roman numerals in parentheses in the following description refer.

When a 2-aminobenzophenone (I) is treated with acetylglycolyl halide under the hereinafter described conditions, there is obtained a 2-acetoxyacetamidobenzophenone (II). For optimum yields the benzophenone is dissolved in a solvent such as chloroform and the acetylglycolyl halide is added dropwise. The solution becomes warm during the addition, and preferably the reaction mixture is heated for approximately 15 minutes on a steam bath after the addition is complete. Any acylglycolyl chloride or bromide may be used since the acyl group is subsequently removed by hydrolysis. Similarly, anhydrides of acylated glycolic acid can be used. Other means for acylating the amines can also be employed, for example the glycolic acid and carbodiimide may be employed. 2-acetoxyacetamidobenzophenone may also be prepared by refluxing a mixture of 2-iodoacetamidobenzophenone obtained as described in the co-pending application of which this is a continuation-in-part referred to above, with sodium acetate in glacial acetic acid. To avoid an excess use, it will be apparent to those skilled in the art of chemistry that the medium in which the reaction is carried out should be inert to the reagents used. Thus, solvents having hydroxy groups labile to acylating agents are not desirable. Similarly, solvents which may react with amino groups should not be used. However, if the cost of the acylating agent were of no consequence, and the product obtained by reaction of the solvent with the acylating agent can maintain the amino aryl ketone in dispersion, a solvent having a group labile to the acylating agent can be used. It is apparent however that under these circumstances the reaction medium while initially reactive, having been acylated has become inert to further reaction.

The acyl group is removed by hydrolysis by dissolving it in alcohol, or other suitable polar solvent, and adding with stirring aqueous sodium hydroxide. Surprisingly, while reaction apparently could occur at either the ester, or the amide linkage, or both, selective hydrolysis of the ester occurs. When the reaction is complete as evidenced by the clearing of the solution, dilution with water precipitates the product alcohol. Hydrolysis of the ester can also be accomplished by means of any alkaline metal hydroxide and many amines.

To the 2-hydroxyacetamidobenzophenone (III) so obtained is added phenylsulfonyl halide. The reaction mixture is warmed on a steam bath for approximately 30 to 60 minutes. On cooling the solution with ice water, the corresponding 2 - phenylsulfonoxyacetamidobenzophenone (IV) is obtained. Any sulfonyl halide may be used, one is not being limited to arylsulfonyl halides; for example an alkylsulfonyl halide would be suitable.

The sulfonoxyacetamidobenzophenone obtained as described above is used for producing the valuable and useful hydroxyaminoacetamidobenzophenones (V), by dissolving it in a solvent such as methyl cellosolve, heating it to approximately 85° C., and adding a solution of hydroxylamine hydrochloride and water containing sodium hydroxide. The temperature is maintained at approximately 85–90° for about 15 minutes. On cooling and dilution with water the product precipitates. The surprising nature of this reaction is manifest. Hydroxylamine is classically a reagent for characterization of a ketone. Qualitative Organic Analyses texts teach that ketones can be identified by forming the reaction product with hydroxylamine. They contain long lists showing ketones and the physical products of the hydroxylamine derivative. Here, although reaction is with a molecule containing a keto group, nucleophilic replacement of the phenylsulfonoxy group occurs.

Alternatively the 2-phenylsulfonoxyacetamidobenzophenone of our invention (IV) may be prepared by treating the aminobenzophenone (I) in chloroform with phenylsulfonoxyacetyl chloride or bromide, also in chloroform, preferably added dropwise to control the temperature of the reaction. After the addition is complete the reaction mixture is heated on the steam bath for 15 minutes to insure optimum yields. Removal of the solvent and recrystallization gives the desired product.

The 2-aminophenyl aryl ketones employed as starting materials in conducting the processes of our invention are known, or are readily prepared by procedures known to those skilled in the art of organic chemistry. The acylglycolyl halides or anhydrides employed as starting materials are also known, or are readily prepared by procedures known to those skilled in the art of organic chemistry. It will be apparent to those skilled in the art of organic chemistry that the acyl group, used to protect the hydroxy moiety of the glycolyl halide or anhydride used; and removed in the subsequent hydrolyses may be any acyl group, thus any esterified 2-hydroxyacetamidobenzophenone convertible to a 2-hydroxyacetamidobenzophenone by hydrolysis is the full equivalent thereof. Similarly, the phenylsulfonoxyacetyl halides which are used in the alternative procedure described below, are prepared by procedures known to those skilled in the art of organic chemistry.

It will be apparent from the disclosure herein to those skilled in the art of organic chemistry that for the purposes of this invention certain of the carbon atoms of the 2-amino aryl ketones employed as starting materials can be substituted with groups which do not interfere with the subsequent reactions involving the 2-amino group. Therefore, in the processes of the invention, except for any limitations expressed in this specification, all 2-amino aryl ketones can be employed as starting materials in the process of making aspect of this invention. In like manner the 2-acyloxyacetamidobenzophenones and the 2-hdroxyacetamidobenzophenones employed as intermediates, may be correspondingly substituted. Furthermore the 2-carbon of the acetamido group, i.e. that to which the carbonyl group is attached, in the intermediate compounds, can be substituted with hydrogen or with alkyl, aromatic, or aralkyl radicals, including the straight and branched chain alkyl radicals, among which are, for the purposes of illustration, without limiting the generality of the foregoing, one or two alkyl radicals such as methyl, ethyl, propyl, isopropyl, butyl, tertiary butyl, isoamyl, and when dialkyl substituted, said alkyl radicals being the same or different, and which can be concatenated to form a hydrocarbon ring; cycloalkyl radicals such as cyclopropyl, cyclobutyl, cyclopentyl; one or two unsaturated radicals such as vinyl, ethynyl, propenyl, aromatic radicals such as phenyl or phenyl substituted with non-interfering groups such as halogen, alkyl, hydroxy, etc.; and the aromatic-aliphatic radicals, benzyl, or phenylethyl, wherein the phenyl group may be similarly substituted or unsubstituted.

Phenyl groups bearing the acetamido constituents can have one or more substituents other than hydrogen, as for example, but without limitation, lower alkyl, chlorine, bromine, trifluoromethyl, or methylsulfonyl at the 3-, 4-, 5-, or 6-positions. Such substituents do not interfere with the course of the reaction here involved. The aryl group of the aryl ketone attached at the one position, can be phenyl, 2- or 3-thienyl; 2- or 3-furyl; 2-, 3-, 4-pyridyl; or 1- or 2-naphthyl. The phenyl nucleus of the phenyl ketone group can bear one or more simple substituents inert to the reactions herein described, such as lower alkyl, chlorine, bromine, trifluoromethyl, or methylsulfonyl and such substituted phenyl ketone compounds are the full equivalents of the unsubstituted phenyl nucleus for the purposes of the present invention.

From the disclosure herein illustrating the invention as applied to benzophenone starting materials, it will be apparent to organic chemists that heterocyclic nuclei can appear in the starting materials, in lieu of the phenyl group, without affecting the course of the reactions involved at the 2-position. Accordingly, such reactions wherein the phenyl group is replaced by 2- or 3-thienyl; 2- or 3-furyl; and 2-, 3-, or 4-pyridyl radicals are the full equivalents of the invention as particularly claimed.

When the starting compounds are substituted as hereinbefore recited, it will be apparent herefrom to those skilled in the art of chemistry that the intermediate compounds and the final products produced by the process of the invention will bear, correspondingly, the same substituents.

The following examples illustrates the best mode contemplated by the inventor of using the claimed processes of the invention and of the manner of making and using a specific embodiment of the claimed composition of the invention.

*Example 1*

To a solution of 40 g. of 2-amino-5-chlorobenzophenone in 150 ml. of chloroform, add dropwise a solution of 26 g. of acetylglycolyl chloride in 60 ml. of chloroform. The solution becomes warm during the addition, and when the addition is completed, heat the reaction mixture on a steam bath for 15 minutes. Remove the solvent under the reduced presssure and recrystallize the residue in methanol to obtain 50 g. (87% yield) of 2-acetoxyacetamido-5-chlorobenzophenone, M.P. 121–123° C.

*Analysis* for $C_{17}H_{14}ClNO_4$.—Calculated: C, 61.5; H, 4.25; N, 4.22; Cl, 10.7%. Found: C, 61.48; H, 4.30; N, 4.07; Cl, 10.9%.

*Example 2*

Reflux a mixture of 100 g. of 2-iodoacetamido-5-chlorobenzophenone, 75 g. of sodium acetate and 600 ml. of glacial acetic acid for 2 hours. Dilute the reaction mixture and recrystallize from alcohol to obtain 2-acetoxyacetamido-5-chlorobenzophenone, M.P. 121–123° C.

*Example 3*

To a suspension of 66.6 g. of 2-acetoxyacetamido-5-chlorobenzophenone in 550 ml. of ethanol, add with stirring a solution of 8 g. of sodium hydroxide and 60 ml. of water. Continue stirring until the solution becomes clear. Add 750 ml. of water to precipitate the product. Recrystallize from ethanol to obtain 55 g. (94% yield) of 2-hydroxyacetamido-5-chlorobenzophenone, M.P. 150–152° C.

*Analysis* for $C_{15}H_{12}ClNO_3$.—Calculated: C, 62.18; H, 4.18; N, 4.84; Cl, 12.24%. Found: C, 62.29; H, 4.15; N, 4.72; Cl, 12.30%.

*Example 4*

To a solution of 15 g. of 2-hydroxyacetamido-5-chlorobenzophenone and 200 ml. of triethylamine add 28 g. of p-bromophenylsulfonyl chloride. Warm the reaction mixture on a steam bath for about 30 minutes. Cool and dilute with ice water, and collect the resulting precipitate. Recrystallize from acetonitrile to obtain 17 g. (66% yield), M.P. 150–152° C. of p-bromophenylsulfonoxyacetamido-5-chlorobenzophenone.

*Analysis* for $C_{21}H_{15}BrClNO_5S$.—Calculated: C, 49.58; H, 2.97; N, 2.75; Br. 15.71; Cl, 6.97; S, 6.30%. Found: C, 49.94; H, 2.84; N, 2.93; Br, 15.6; Cl, 6.80; S, 6.30%.

Following the procedure described above, p-tosyloxyacetamido-5-chlorobenzophenone (76% yield, M.P. 148–150° C.) was prepared from 2-hydroxyacetamido-5-chlorobenzophenone and p-tosyl chloride.

Analysis for $C_{22}H_{18}ClNO_5S$.— Calculated: C, 59.52; H, 4.09; Cl, 7.99; S, 7.22%. Found: C, 59.57; H, 3.97; Cl, 8.0; S, 7.2%.

Following the procedure described above methylsulfonoxyacetamido-5-chlorobenzophenone, M.P. 120–122° C. is prepared from 2-hydroxyacetamido-5-chlorobenzophenone and methylsulfonyl chloride.

Analysis for $C_{16}H_{14}ClNO_5S$.—Calculated: C, 52.24; H, 3.84; N, 3.81; Cl, 9.64; S, 8.70%. Found: C, 52.30; H, 3.78; N, 3.83; Cl, 9.7; S, 9.0%.

*Example 5*

Following the procedure of Example 1, treat a solution of toluenesulfonoxyacetyl chloride in chloroform with 2-amino-5-chlorobenzophenone in chloroform, to obtain 2-toluenesulfonoxyacetamido - 5-chlorobenzophenone, M.P. 148–150° C. recrystallized from acetonitrile.

*Example 6*

Following the procedure of Example 1, prepare 2-phenylsulfonoxyacetamido - 5 - chlorobenzophenone from 2 - amino - 5-chlorobenzophenone and phenylsulfonoxyacetyl chloride, M.P. 130–132° C.

Analysis for $C_{21}H_{16}ClNO_5S$.—Calculated: C, 58.67; H, 3.75; Cl, 8.25; N, 3.26; S, 7.46%. Found: C, 58.56; H, 3.62; Cl, 8.56; N, 3.56; S, 7.5%.

The following examples illustrates the claimed processes and methods of using the compositions of the invention.

*Example 7*

To 5.1 g. of p-bromophenylsulfonoxyacetamido-5-chlorobenzophenone in 100 ml. of methyl cellosolve heated to 85° C. add a solution of 10 g. hydroxylamine hydrochloride, 5 g. of sodium hydroxide, and 20 ml. of water. Maintain the temperature at 80–90° C. for 15 minutes. Cool and dilute with water. Collect the product and recrystallize from benzene to obtain 2-hydroxyaminoacetamido-5-chlorobenzophenone (M.P. 129–131° C.).

Following the above procedure prepare 2-hydroxyaminoacetamido-5-chlorobenzophenone from 2-p-toluenesulfonoxyacetamido-5-chlorobenzophenone and hydroxylamine.

Following the procedure described above prepare 2-hydroxyaminoacetamido - 5 - chlorobenzophenone from 2 - phenylsulfonoxyacetamido-5-chlorobenzophenone and hydroxylamine.

The subject matter which the applicant regards as his invention is particularly pointed out and distinctly claimed as follows:

1. 2-acetoxyacetamido-5-chlorobenzophenone.

References Cited

UNITED STATES PATENTS 3,141,890   7/1964   Reeder et al. _____ 260—562

LORRAINE A. WEINBERGER, *Primary Examiner.*

VIVIAN GARNER, *Assistant Examiner.*